Sept. 7, 1948.  A. M. FISCHER  2,448,927
METHOD OF AND APPARATUS FOR PROCESSING YEAST
Filed June 19, 1942
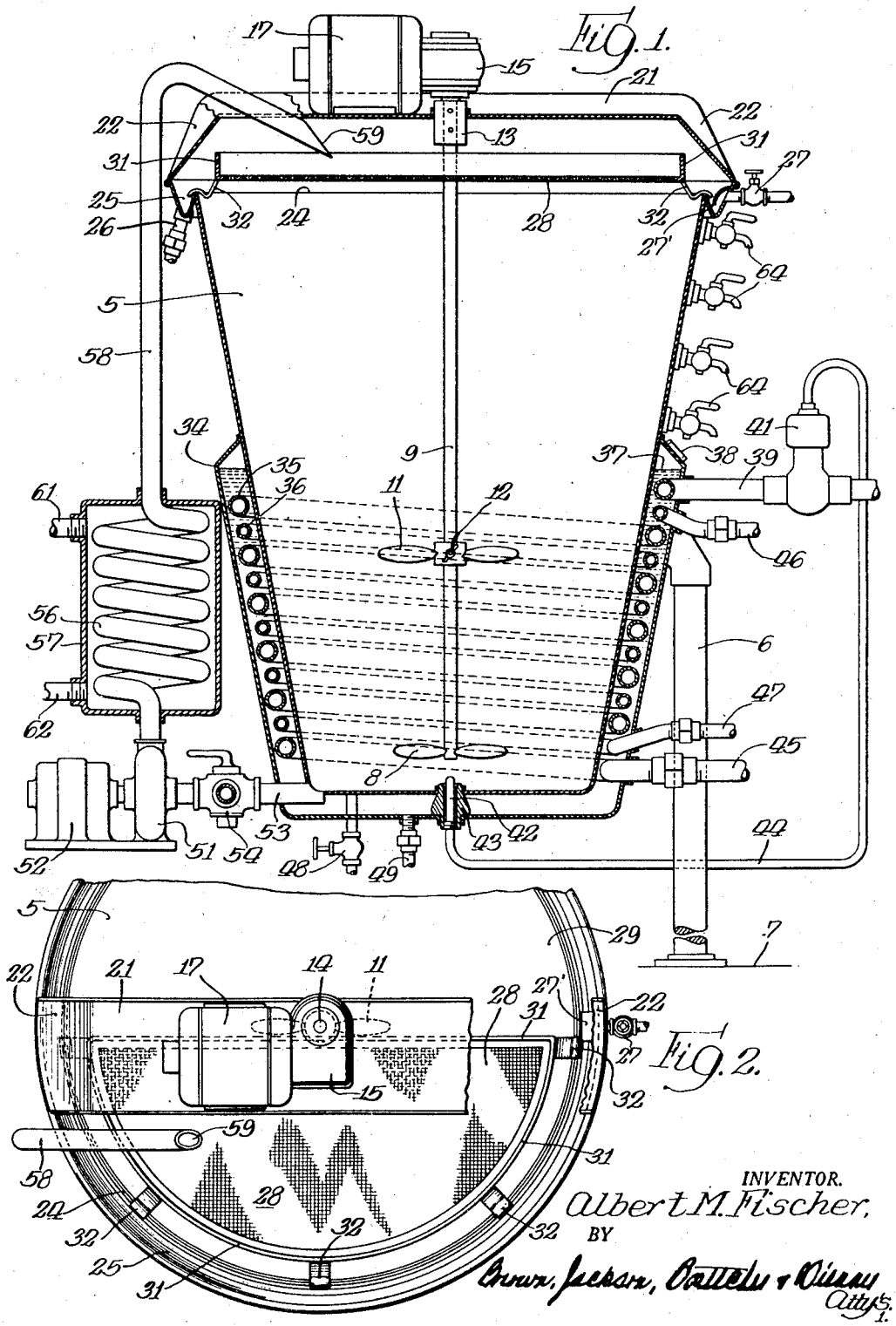
INVENTOR.
Albert M. Fischer,
BY Patented Sept. 7, 1948

2,448,927

UNITED STATES PATENT OFFICE 2,448,927

METHOD OF AND APPARATUS FOR PROCESSING YEAST

Albert M. Fischer, Chicago, Ill., assignor of forty per cent to John E. Mistarz, Chicago, Ill.

Application June 19, 1942, Serial No. 447,660

13 Claims. (Cl. 195—134)

The present invention relates to an improved method of and apparatus for processing yeast, and more particularly brewer's pitching yeast.

The general object of the invention is to provide an improved method of and apparatus for performing the successive steps of screening, washing and aerating brewer's pitching yeast, or for performing any one or more of these steps. All of these steps are performed in the same treatment tank of the apparatus.

It is well known to those skilled in the art that the screening and washing of brewer's yeast is an important step in the preparation of such yeast for pitching. Screening removes trub and hop resins, while washing removes such impurities as dead yeast cells, bacteria, albuminous matter and the like. Depending upon the degree of washing, it will remove objectionable bitter substances of hop as well as the phenol taste, characteristic of some yeasts, which would otherwise be imparted to the beer.

One of the features of the invention resides in the improved screening of the yeast. In the performance of this step, the batch of yeast, water, waste solids, etc., is agitated substantially continuously in the treatment tank, and portions of the batch are withdrawn substantially continuously and passed through a separating screen for separating the trub and hop resins, etc., from the yeast-water mixture, the mixture being returned to the tank.

Another feature of the invention resides in the improved purification i. e. washing of the yeast without any substantial loss of healthy yeast cells. In the performance of this step, the yeast-water mixture is agitated substantially continuously in the treatment tank and is caused to revolve at a sufficient speed to create substantial centrifugal force in any solids floating on the surface of the mixture, whereby to carry these solids outwardly to the sides of the tank for discharge over the brim or spill edge of an overflow trough. Of course the overflowing wash water also contains in solution the bitter substances of hop. The rate of such discharge into the overflow trough is regulated by governing the rate of inflow of water into the rotating batch, such regulated inflow governing the level of the rotating batch.

Another feature of the invention resides in the improved aeration of the yeast, before pitching. During the performance of this step, or preparatory thereto, the so-called first wort is preferably added to the yeast batch in the treatment tank. This yeast-wort mixture is preferably agitated substantially continuously in the tank, and portions of this batch are withdrawn substantially continuously from the batch and are sprayed into the air and then returned to the treatment tank. The previously described screening and washing operations are preferably performed at a relatitvely low temperature, in the neighborhood of 33° F., but for the performance of this aerating operation, the temperature of the mixture is preferably raised somewhat, as for example to approximately 48° F., so as to accelerate to the desired fermentation of the yeast induced by the addition of the first wort.

Other objects, features and advantages of the invention will appear from the following detailed description of one preferred method of practicing the invention and one preferred form of apparatus for carrying the invention into effect. In the accompanying drawings illustrating such embodiment:

Figure 1 is a vertical sectional view through the treatment tank and associated apparatus; and Figure 2 is a fragmentary plan view of the treatment tank.

The treatment tank is indicated in its entirety at 5, preferably being of conical formation, and having any suitable mounting, such as on the three or more supporting legs 6 secured to the floor 7. The tank is preferably composed of stainless steel, monel metal, glass lined steel, copper, or other suitable material, so as to be sanitary, non-corrosive, and not likely to taint the yeast or affect the beer. The contents of the tank are adapted to be agitated by a main agitator 8 mounted on a vertical drive shaft 9 extending down substantially axially of the tank 5. The agitator 8 is preferably of the propeller type and has its blades pitched to impel the liquid upwardly from the lower portion of the tank. A secondary agitator 11, also preferably of the propeller type, is adjustably mounted on the shaft 9, such as through the medium of a set screw 12 or the like. This enables the secondary agitator to be positioned at any working level in the liquid contents of the tank, and so permit a regulation in the speed of rotation on the surface of the yeast-water mixture. It can also be shifted upwardly to a position above the upper level of the liquid, where it will merely idle and perform no agitating function.

The upper end of the agitator shaft 9 is connected through a coupling 13 with a short vertical drive shaft 14 extending upwardly into a gear reduction housing 15, this drive shaft being keyed to a worm wheel within said reduction housing. An electric motor 17 has its rotor shaft connected to a worm which drives the worm wheel in the housing 16, such worm and worm wheel not being shown because their construction and operation will be well understood. The speed reduction is preferably such as to drive the agitator shaft at approximately 100 R. P. M., although it will be understood that this speed is given merely by way of example. The electric motor, speed reduction unit and agitator shaft are carried by a supporting bridge 21 which extends across the top of the tank and has downwardly extending arms 22 bearing on the outer rim of the overflow trough of the tank. The bridge is of channel-shaped cross section, and the motor 17 is bolted to the web of said channel.

Surrounding the circular upper edge 24 of the tank is an overflow trough 25, from which leads a drain connection 26. This trough is of approximately U-shaped cross section comprising an inner flange which is welded to the body of the tank 5 and comprising an outer flange on which the downwardly extending arms 22 of the supporting bridge bear. The upper edge 24 of the tank functions as a spill edge or overflow edge, over which dead yeast cells, bacteria and any solids floating on the surface are carried in the yeast washing operation. These spill-over materials fall into the trough 25 and are carried away to a point of discharge through the outlet connection 26. A water inlet valve 27 and associated deflecting baffle 27' may be connected opposite the outlet 26 to flush out the yeast foam accumulating in trough 25.

A straining screen 28 is removably supported at the upper end of the processing tank. As viewed in plan in Figure 2, it will be seen that this screen is of D-shaped outline so that it only extends across approximately one-half the upper area of the tank. The other portion of the top of the tank is open, as indicated at 29, so as to permit the yeast and wort to be dumped into the tank at this side. The screen is preferably of relatively fine mesh wire capable of removing hop resins, trub, etc., from the batch when portions of this batch are pumped up over the screen. A vertical confining flange 31 extends upwardly from the edges of the screen to prevent material collecting on the upper surface of the screen from discharging over the edge of the screen. Supporting brackets or feet 32 project downwardly from the semi-circular margin of the screen and are adapted to seat at spaced points on the upper spill edge 24 of the tank. It will be evident that when a large amount of waste material has accumulated on the upper surface of the screen, the screen can be readily removed sidewise out from under the bridge 21 for dumping this accumulation of material.

Surrounding the lower half and bottom of the treatment tank is a heat transfer jacket 34. Confined between the tank and the wall of the jacket are successive convolutions of a cooling coil 35, and alternating therewith are the successive convolutions of a heating coil 36. All of the remaining jacket space is filled with a suitable anti-freeze solution 37, such as water and Prestone, this solution being introduced into the jacket through the upper normally closed filler opening 38. The inlet pipe 39 leading to the cooling coil 35 has an automatic regulating valve 41 interposed therein. This regulating valve is made thermally responsive to the temperature of the batch in the treatment tank, this being effected through a conventional thermally responsive element 42 which has communication with the liquid in the bottom of the tank. This thermally responsive element is thermally insulated from the heat transferring liquid 37 in the jacket 34, such as by surrounding the thermally responsive element 42 with a thermally insulating bushing 43. A small conduit 44 conveys variations of pressure from the thermally responsive element 42 to the automatic regulating valve 41. The action is such that when a coolant is being circulated through the cooling coil 35 for maintaining the treatment batch at a low temperature, such temperature can be maintained consistently within relatively close limits by the automatic regulating control exercised through valve 41. The cooling coil 35 may be designed to carry brine solution, ammonia, or any other coolant of any pressure occurring in the refrigerating system of the brewery. The outlet from the cooling coil is indicated at 45.

The heating coil 36 has connection through the inlet and outlet pipes 46 and 47 with a source of steam supply or with any other suitable source of heating fluid. By providing both a cooling coil and heating coil 36 in the jacket 34 the batch of yeast and water can be maintained at a relatively low temperature during the screening and washing operations; and thereafter during the aerating operation, or preparatory thereto, the batch of yeast, water and wort can have its temperature quickly raised to approximately 48° or so for accelerating the desired fermentation of the yeast during the aerating operation. It should be noted that by employing a separate thermal jacket 34 and by having the two coils 35 and 36 immersed within a heat transferring liquid 37 contained in this jacket, a very large and effective heat transferring area can be obtained without the necessity of employing heavy gauge metal for either the tank 5 or the jacket 34. That is to say, neither the wall of the tank nor the wall of the jacket is subjected to the pressure of the cooling medium nor the pressure of the heating medium, and hence a relatively light gauge metal may be employed, which effects a substantial saving of cost in view of the fact that the tank and jacket are both preferably constructed of stainless steel, Monel or other expensive metal. Entering the lower portion of the tank is a valve controlled water inlet 48 for adding water to the batch. The bottom of the jacket 34 is also provided with a drain outlet 49.

Referring now to the circulating apparatus which is operative to draw the yeast from the bottom of the tank and to discharge it back into the upper end of the tank, this apparatus comprises a centrifugal pump 51 driven by an electric motor 52. An outlet pipe 53 leads from the bottom of the tank 5 and connects through a 3-way valve 54 with the inlet of the pump 51. The outlet of said pump is connected with a heat transfer coil 56 contained in a transfer jacket 57. The other end of this coil 56 is connected through pipe 58 which has an outlet 59 positioned to discharge above the screen 28. The heating chest 57 is provided with inlet and outlet connections 61 and 62 for circulating warm water therethrough.

Mounted on the upper half of the processing tank are a plurality of drain cocks 64 disposed at successive levels for successively draining off the upper levels of the batch after the treatment thereof.

In the performance of my improved method, the first step is that of screening the yeast. The tank is first filled with the yeast to be treated up to approximately the level of the lower drain cock 64. Thereupon, sterile water having a temperature of about 33° F. is added to the tank to bring the solution up to a level approximately one-half inch or so below the spill-over rim 24 of the tank. As an alternative and probably preferred sequence, the water can be filled in first and cooled down to 33° F. After this temperature has been reached, the yeast to be treated can then be cooled. After the tank has been filled by either sequence, the motor 17 is then started, and the yeast and water are thoroughly mixed. The outlet valve 54 is now opened and the motor 52 started for running the circulating pump 51. This causes a continuous circulation to occur from the bottom of the tank through outlet pipe 53, pump 51, coil 56, pipe 58 and discharge nozzle 59 to the screen 28 and thence back into the upper end of the tank. The yeast flows readily through this screen 28 back into the tank, but the hop resins and trub are separated out on the upper side of the screen. During this screening operation the agitating propeller is kept in operation so as to keep the yeast well suspended. This screening operation requires only a few minutes, compared to the laborious, lengthy operation usually necessary when screening undiluted yeast by hand as has been the practice in breweries heretofore. Upon the completion of the screening operation, the 3-way valve 54 is closed and the pump 51 is stopped. The screen can be readily lifted off the upper edge of the tank for dumping the waste materials which have accumulated thereon.

The next step is the actual washing of the yeast. The rotation of the agitating propeller 8 is continued to keep the body of suspended material in the tank in rotation. That portion of the suspended material immediately adjacent the propeller 8 will have substantially the same speed as the propeller, but the speed of rotation of the mixture will decrease toward the outer edge of the mixture and also toward the top level thereof. The conical shape of the tank also assists in proportioning the relative speeds so that the upper level of the mixture will revolve at a desirable lower ratio of the speed of the propeller. The propeller must rotate with sufficient speed to stir up the yeast in the bottom of the tank, but it should be noted that too great an agitation is objectionable because it may result in the loss of a considerable amount of healthy yeast cells. The speed of rotation of the agitating propeller and the dimensions of the tank are so proportioned that the yeast-water mixture, while rotating slower in the upper strata, will have a speed of rotation which will develop sufficient centrifugal force to carry floating solids to and over the spill edge 24 into the trough 25. By reason of the conical taper of the tank and the smooth inner walls thereof, those buoyant solids which are carried centrifugally into contact with the side walls of the tank below the surface of the mixture are deflected in an upward and outward direction toward the surface and toward the spill edge 24. The rate of overflow into the trough 25 can be very closely regulated by regulating the rate of inflow of water into the tank through the valve controlled water inlet 48. Inasmuch as bacteria and dead yeast cells have a lower specific gravity than healthy yeast cells, the former will flow to the surface of the suspended material first, where centrifugal force will carry these impurities to the spill-edge. The wash water admitted through valve 48 will create the desired overflow and wash the impurities and foam accumulated on the surface into the overflow-trough 25, so that they will be completely removed from the pitching yeast. The temperature of the mixture will be maintained relatively low during the screening and washing operations, preferably in the neighborhood of 33° F. The automatic temperature control maintained by the regulating valve 41 will be so set as to maintain this approximate temperature. This low temperature will accelerate the settling out of the remaining healthy yeast cells. As the yeast settles down to the lower levels, the drain cocks 64 are opened successively, beginning with the uppermost cock, so as to drain off the water at successive levels until the main bulk of water has been drained from the yeast. The yeast thus treated is of superior quality, and is freed of all impurities which are capable of removal by mechanical treatment. Of course, alkalies can be added for the washing operation if desired, such, for instance, ammonium persulfate, which will aid in reducing the bacterial count and also aid to dissolve hop resins. If desired, the wash water may also be slightly acidified to accomplish speedier settling of the yeast.

After the yeast has been thus screened and washed and the water has been drained off, the apparatus may be further used for the aeration of the yeast before pitching. This is accomplished by the addition of so-called first wort, the aeration being carried out by the propeller agitation of the yeast-wort mixture, this mixture being simultaneously pumped through the circulating pump 51 and sprayed out over the clean upper surface of the screen 28. The discharge of the mixture from the outlet 59 results in substantial aeration of the mixture, and this is greatly augmented by the action of the screen in scattering and breaking up the stream of liquid into minute streams or droplets, thereby greatly increasing the effective area of the liquid for aeration. During the performance of this aerating operation, the flow of coolant through the cooling coil 35 is preferably shut off, and a flow of heating fluid is caused to occur through the heating coil 36 so as to raise the temperature of the yeast a slight amount. As previously indicated, this temperature is approximately in the neighborhood of 48° F., such temperature accelerating the desired ferementation of the yeast induced by the addition of the first wort. In this operation of raising the temperature of the yeast to approximately 48° F., a portion of the heating function may be performed at the heat transfer coil 56 by circulating warm water through the heating chest 57, or, if desired, the entire heating operation may be performed at the heating coil 56, thus eliminating heating coil 36 altogether. Conversely, the entire heating operation may be performed by the heating coil 36, thus eliminating coil 56 altogether. As soon as the yeast has reached the desired degree of fermentation, it is ready to be transferred to the fermenting tank. This discharge operation is performed through the other outlet port of the 3-way valve 54.

While I have illustrated and described what I regard to be the preferred process of my invention, and the preferred apparatus for carrying this process into effect, nevertheless it will be understood that such are merely exemplary and that numerous modifications and rearrangements may be made therein without departing from the essence of the invention.

I claim:
1. The method of treating brewers pitching yeast which comprises rotating a batch of such yeast substantially horizontally in a stationary conically tapered treatment tank having its large end uppermost, so as to produce a slower rate of rotation of the yeast-water mixture on the top level than on the lower levels in close proximity to the agitator, whereby all impurities throughout the body of the mixture, including those in contact with the side walls of the tank, which are of lighter specific gravity than that of healthy yeast cells are caused to flow to the surface and to move outwardly under centrifugal force, and then causing these impurities to be discharged from the upper portion of said conical tank by in-flowing water into the lower portion of said tank.

2. The method of treating brewers pitching yeast which comprises rotating a batch of said yeast-water mixture substantially horizontally in such manner as to effect a slower rate of rotation of the yeast-water mixture on the upper levels of said batch than on the lower levels, whereby all impurities throughout the entire batch which are of lighter specific gravity than that of healthy yeast cells are caused to flow to the surface and to move outwardly under centrifugal force, and then causing these impurities to be discharged from the upper portion of the batch by flowing water into the lower portion of the batch.

3. The method of treating brewers pitching yeast which comprises rotating a batch of the yeast-water mixture substantially horizontally in a conically tapered stationary treatment tank with consequent slower rate of rotation of the yeast-water mixture on the upper levels than on the lower levels in said tank, whereby impurities throughout the body of the batch and in contact with the side walls of the tank which are of lighter specific gravity than that of healthy yeast cells are caused to flow to the surface and to move outwardly under centrifugal force, causing these impurities to be discharged from the upper portion of said conically tapered tank by introducing water into the lower portion of said tank, and causing a circulatory flow of said yeast-water mixture from said tank through a screening medium and thence back to said tank.

4. The method of treating brewers pitching yeast which comprises imparting substantially horizontal rotary motion to a batch of such yeast in a treatment receptacle, whereby to cause impurities of lighter specific gravity than that of healthy yeast cells, including such impurities in contact with the side walls of the receptacle, to flow to the surface and to move outwardly under centrifugal force, and causing these impurities to be discharged by effecting a controlled overflow from the upper portion of the receptacle.

5. The method of treating brewers pitching yeast, which comprises imparting substantially horizontal rotary motion to a mixture of such yeast and water in a stationary treatment tank, whereby to cause impurities of relatively light specific gravity in such mixture to move to the surface and outwardly under centrifugal force, including such impurities in contact with the side walls of the tank below the surface, and causing these impurities together with the wash water containing dissolved hop resins to be discharged from the surface level of said mixture at the upper edge of said tank, by introducing additional liquid into the tank, at a controlled rate.

6. The method of treating brewers pitching yeast, which comprises agitating a mixture of such yeast and water within a stationary treatment tank, maintaining said mixture at a relatively low temperature to inhibit further fermentation and weakening of the yeast, imparting a horizontal rotary motion to such mixture in said tank at a sufficient speed to cause dead yeast cells, bacteria and other impurities in suspension or solution including those in contact with the side walls of the tank below the surface to be carried upwardly and outwardly toward the perimeter of the rotating mass under centrifugal force, and then causing these solid and semi-solid materials to discharge at a controlled rate over a spill edge at the upper end of said tank by introducing water into the lower portion of said tank at a controlled rate.

7. The method of treating brewers pitching yeast which comprises agitating a mixture of yeast and water in a vertically disposed frusto-conical stationary treatment tank having its large end uppermost, screening this mixture whereby trub and hop resins are separated out and the remaining portion of said mixture is returned to said tank, then washing the yeast by rotating the yeast-water mixture so as to cause substantially solid impurities throughout the body of the mixture including those in contact with the side walls of the tank below the surface to move upwardly and outwardly to the surace and outwardly under centrifugal force toward the edge of the tank, causing a controlled inflow of sterile water or other suitable liquid to the tank to cause such substantially solid materials to be spilled over an overflow edge at the upper part of said tank, maintaining the yeast-water mixture at a temperature of approximately 33° F. during such screening and washing operations, draining off the bulk of the water from such mixture, and then aerating the yeast by adding first wort thereto, raising the temperature of such yeast-wort mixture to approximately 48° F., and pumping such yeast-wort mixture to an elevated point and spraying it therefrom for aerating the mixture, the latter returning to said tank.

8. In apparatus for treating brewers pitching yeast, the combination of a stationary vertically disposed tank of conical taper having its smaller diameter at the bottom, an agitator situated in relatively close proximity to the bottom of said tank, means for driving said agitator at a speed sufficient to agitate a yeast-water mixture in said tank and to cause circular movement of said mixture at a velocity tending to cause solid materials to move outwardly under centrifugal force, the conical shape of said tank causing the upper level of said mixture to have a slower rate of rotation than lower levels thereof, said tank having relatively smooth inner walls whereby such solid materials as are in contact with these walls below the surface can move upwardly to the surface a spill edge at the upper end of said tank over which solid materials are adapted to be discharged, and a discharge trough around said spill edge for conveying such solid materials away from the tank together with the wash water.

9. The method of treating brewers pitching yeast, which comprises diluting it with sterilized water, adding a suitable alkaline to aid in dissolving hop resins and reducing the bacteria count, agitating the mixture to cause intensive foaming of the yeast-water mixture, and removing the foam containing the resinous matter and other impurities, from the top of the mixture by the introduction of water into the lower portion of the mixture.

10. In apparatus for treating brewers pitching yeast, the combination of a vertically disposed stationary tank of conical taper having its smaller diameter at the bottom, said tank adaped to contain a batch of yeast-water mixture, power driven agitator means in the lower portion of said tank imparting horizontal rotary motion to the entire batch of yeast-water mixture within the tank at a velocity tending to cause solid materials within the batch to move outwardly under centrifugal force, said tank having relatively smooth inner walls whereby such solid particles as are in contact with said inner walls can move upwardly to the surface of the mixture the conical shape of said tank causing the upper level of the batch to have a slower rate of rotation than lower levels thereof, a spill edge adjacent the upper end of said tank over which solid materials are adapted to be discharged, a discharge trough around said spill edge for conveying such solid materials away from the tank, and a liquid inlet pipe opening into the lower portion of said tank through which liquid can be introduced into the lower portion of the tank without disturbing the rotary motion of the batch, whereby to control the level of the batch so as to govern the rate of spill over said edge into said trough.

11. In apparatus for treating brewers pitching yeast, the combination of a vertically disposed stationary tank of conical taper having its smaller diameter at the bottom, said tank adaped to contain a batch of yeast-water mixture, a supporting bridge extending across the top of said tank, an electric motor mounted on said bridge, a substantially vertical shaft extending downwardly from said bridge substantially axially into said tank, reduction gearing connecting said electric motor with said shaft, agitator means mounted on said shaft adjacent the lower portion of said tank operating to impart horizontal rotary motion to the entire batch of yeast-water mixture within the tank at a velocity tending to cause impurities of lighter specific gravity than healthy yeast cells to move outwardly under centrifugal force and to flow to the surface, the conical shape of said tank causing the upper level of the mixture to have a slower rate of rotation than lower levels thereof and said tank having relatively smooth inner walls so as to impart an upward component to such impurities striking the side walls of the tank, a spill edge adjacent the upper end of said tank over which said impurities are adapted to be discharged, a discharge trough coacting with said spill edge for conveying such impurities to a point of discharge, and a water inlet pipe opening into the lower portion of the tank for introducing water into the lower portion of the tank without disturbing the rotary motion of the batch, whereby to control the level of the batch so as to govern the rate of spill over said edge.

12. In apparatus for treating brewers pitching yeast, the combination of a stationary tank of conical taper with its axis vertically disposed and having its smaller diameter at the bottom, said tank adapted to contain a mixture of yeast and water, a substantially vertical agitator shaft extending approximately axially in said tank, a propeller type of agitator mounted on said shaft and having its blades pitched to impel the liquid upwardly from the lower portion of said tank, power means for driving said agitator so as to impart horizontal rotary motion to the entire batch of yeast and water within the tank at a velocity tending to cause impurities of lighter specific gravity than healthy yeast cells to move outwardly under centrifugal force and to flow to the surface, the conical shape of said tank causing the upper levels of the batch to have a slower rate of rotation than lower levels thereof, said tank having relatively smooth inner walls whereby such impurities impelled outwardly into contact with said walls below the surface will be deflected upwardly toward the surface a spill edge adjacent the upper end of said tank over which said impurities are adapted to be discharged, and a water inlet pipe for introducing water into the lower portion of the tank without disturbing the rotary motion of the batch whereby to control the level of the batch so as to govern the rate of spill over said spill edge.

13. In apparatus for treating brewers pitching yeast, the combination of a stationary tank of conical taper with its axis vertically disposed and having its smaller diameter at the bottom, said tank adapted to contain a batch of yeast-water mixture, power driven agitator means in the lower portion of said tank imparting horizontal rotary motion to the entire batch of yeast and water within the tank at a velocity tending to cause impurities of lighter specific gravity than healthy yeast cells to move outwardly under centrifugal force and to flow to the surface, the conical shape of said tank causing the upper level of the batch to have a slower rate of rotation than lower levels thereof, said tank having relatively smooth inner walls whereby such impurities as are impelled outwardly into contact with said walls below the surface will be deflected upwardly toward the surface a spill edge adjacent the upper portion of said tank over which said impurities are adapted to be discharged, a valve controlled water inlet pipe for introducing water into the lower portion of the tank without disturbing the rotary motion of the batch for controlling the level of the batch so as to govern the rate of spill over said spill edge, a screen disposed above said spill edge of the tank, and circulating means including a pump for drawing the yeast-water mixture from said tank and discharging it up over said screen for precipitation down through said screen back to said tank.

ALBERT M. FISCHER.

REFERENCES CITED

The following references are of record in the file of this patent:

UNITED STATES PATENTS

| Number | Name | Date |
| --- | --- | --- |
| 215,287 | Pennington | May 13, 1879 |
| 391,775 | Bradley | Oct. 30, 1888 |
| 470,361 | Kliemetschek | Mar. 8, 1892 |
| 642,460 | Kersten | Jan. 30, 1900 |
| 1,076,666 | Dorr | Oct. 28, 1913 |
| 1,139,507 | Ekstrom | May 18, 1915 |
| 1,166,139 | Marwedel | Dec. 28, 1915 |
| 2,022,926 | Schlank | Dec. 3, 1935 |
| 2,076,114 | Bethancourt | Apr. 6, 1937 |
| 2,083,347 | Wessblad | June 8, 1937 |
| 2,131,513 | Heller | Sept. 27, 1938 |
| 2,137,547 | Snow | Nov. 22, 1938 |
| 2,301,461 | Schnetz | Nov. 10, 1942 |